United States Patent
Mast et al.

(10) Patent No.: US 6,382,031 B1
(45) Date of Patent: May 7, 2002

(54) FOIL MANOMETER

(75) Inventors: Friedrich Mast, Garching; Gerold Schramm, Gröbenzell; Martin Münch, München, all of (DE)

(73) Assignee: Max-Planck-Gesellschaft zur Forderung der Wissenschaften e. V. (DE)

( * ) Notice: Subject to any disclaimer, the term of this patent is extended or adjusted under 35 U.S.C. 154(b) by 0 days.

(21) Appl. No.: 09/381,262

(22) PCT Filed: Mar. 19, 1998

(86) PCT No.: PCT/EP98/01621
§ 371 Date: Oct. 19, 1999
§ 102(e) Date: Oct. 19, 1999

(87) PCT Pub. No.: WO98/43058
PCT Pub. Date: Oct. 1, 1998

(30) Foreign Application Priority Data

Mar. 21, 1997 (DE) ............ 197 11 874

(51) Int. Cl.⁷ ............ G01L 21/12; G01L 19/04
(52) U.S. Cl. ............ 73/755; 73/708; 73/862.33
(58) Field of Search ............ 73/755, 5 R, 715, 73/721, 719, 750, 753, 862.621, 862.581, 862.622, 862.623, 861.01, 204.11, 204.17, 204.18, 204.25, 756, 152.12; 338/4, 318, 3, 5, 36, 42, 708

(56) References Cited

U.S. PATENT DOCUMENTS

| | | | | |
|---|---|---|---|---|
| 4,471,648 A | * | 9/1984 | Uchida et al. | 73/23 |
| 4,682,503 A | * | 7/1987 | Higashi et al. | 73/755 |
| 4,784,721 A | * | 11/1988 | Holmen et al. | 156/647 |
| 4,812,801 A | * | 3/1989 | Halvis et al. | 338/4 |
| 5,597,957 A | * | 1/1997 | Schieferdecker et al. | 73/755 |
| 5,898,359 A | * | 4/1999 | Ellis | 338/47 |

FOREIGN PATENT DOCUMENTS

| | | |
|---|---|---|
| DE | 43 08 434 A1 | 9/1994 |
| DE | 43 10 324 A1 | 10/1994 |
| DE | 44 14 349 A1 | 6/1995 |

* cited by examiner

*Primary Examiner*—Max Noori
*Assistant Examiner*—Abdullahi Aw-Musse
(74) *Attorney, Agent, or Firm*—Schnader Harrison; Segal & Lewis LLP

(57) ABSTRACT

A pressure gauge device that is operated as a thermal conduction manometer contains a measuring resistor (131) that is arranged in layer form on a self-supporting carrier foil and is in defined thermal contact with a gas whose pressure is to be measured. The thermal contact with the gas is through the carrier foil (11), a thermal conducting layer (123) and optionally through an extra absorber layer (124). The resistance, dependent on gas pressure, of the measuring resistor (131) is detected by a bridge circuit in which each measuring resistor (131) is assigned a reference resistor (136) whose resistance itself is dependent on or independent of pressure.

20 Claims, 6 Drawing Sheets

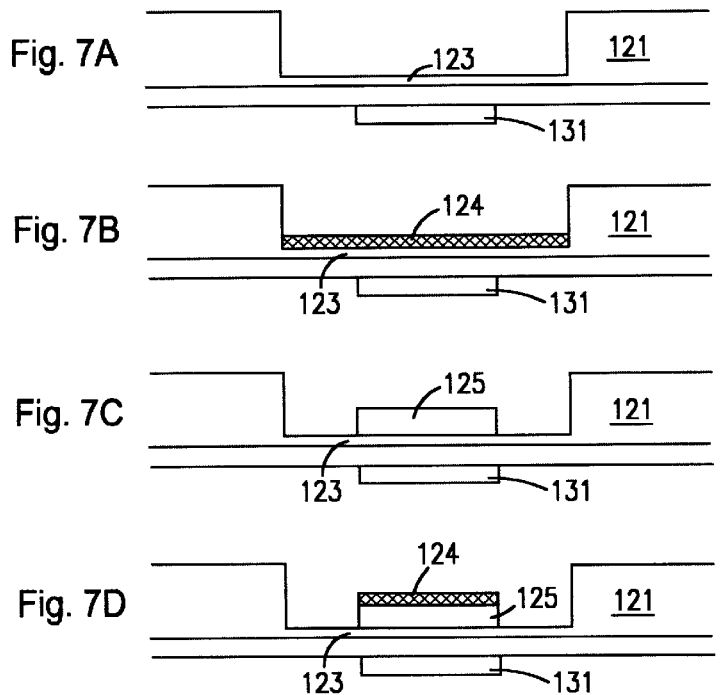
Fig. 7A
Fig. 7B
Fig. 7C
Fig. 7D
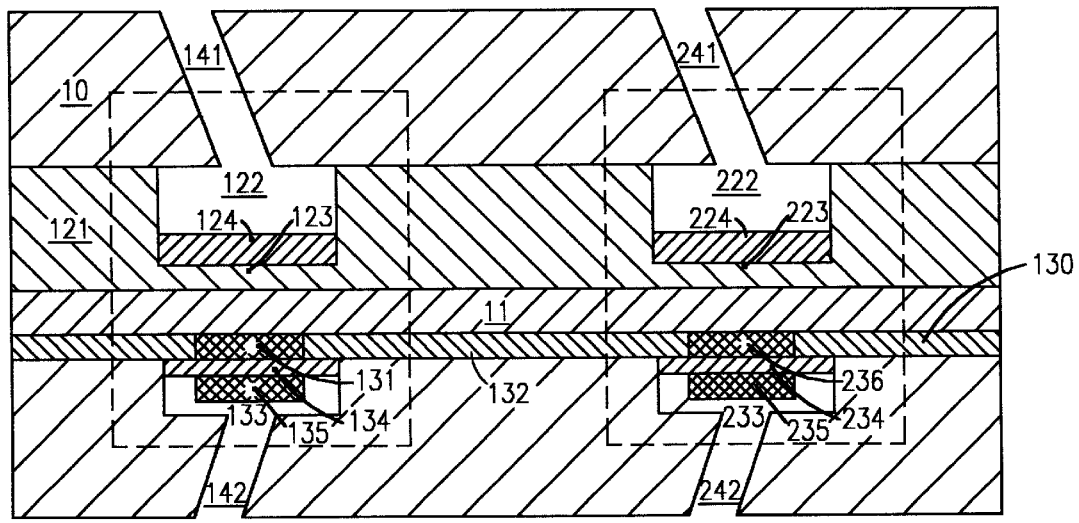
Fig. 8

FOIL MANOMETER

FIELD OF THE INVENTION

The invention is related to a pressure gauge device that is operated as a thermal conduction manometer and methods of measuring pressure with a pressure gauge device of this kind.

The specific thermal conductivity of a gas at low pressures, when the mean free path length is comparable with the magnitude of the vessel dimensions, is dependent on gas pressure, which is made use of in the thermal conduction manometer for measuring pressure. In the simplest case a thermal conduction manometer comprises a self-supporting resistance wire in the gas to be measured. The resistance wire is heated with constant electrical power. As soon as the mean free path length of the gas particles reaches the dimension of the wire diameter, the thermal conductivity of the gas becomes dependent on pressure. With decreasing pressure the heat current conducted by the gas drops, so that the wire temperature is dependent on pressure at constant heating power. Below a lower pressure limit the heat discharge through the gas can be ignored compared to heat discharge through the leads or through thermal radiation, so that the conducted heat current is independent of pressure and the temperature of the resistance wire is thus constant.

The wire temperature can be determined from the resistance of the wire. In the Pirani manometer the resistance is measured by a Wheatstone bridge circuit, in which one resistor is formed by the measuring resistance wire and a reference resistor, of the same design as the test resistance wire, is operated under constant pressure.

Thermal conduction manometers designed as Pirani manometers generally exhibit the following disadvantages. The resistance wires, with as small a diameter as possible to produce as high an initial pressure as possible (see above), usually consist of a material of relatively high resistance (e.g. tungsten or molybdenum). High-resistance materials will only allow operation of the measuring bridge circuit with direct current. Furthermore, the susceptibility to electromagnetic interference increases, which is a particular disadvantage in plasma physics experiments. Consequently the accuracy of familiar Pirani manometers is limited. Additionally, manometer design with self-supporting resistance wires is sensitive to mechanical stress and recipient ventilation. Finally, no compact design of the familiar Pirani manometer has yet been implemented, meaning that use of these manometers is generally restricted to unspecific pressure measurements in the operation of vacuum plants.

Other thermal conduction manometers, known from U.S. Pat. No. 5,557,972, DE-OS 43 10 324 and DE-OS 44 13 349 for example, contain a measuring resistor that, instead of the above mentioned wire form, is of a flat layer form. These resistance manometers may exhibit higher sensitivity but have a drawback in terms of dynamic response and mechanical stability. To achieve high sensitivity there are namely measures for thermal isolation of the measuring resistor from the remainder of the manometer. This results in relatively long times for setting a thermal equilibrium between the gas to be measured and the measuring resistor, so changes in pressure cannot be detected that are shorter than the time for setting the thermal equilibrium. In conventional thermal conduction manometers the measuring resistor is created on membranes produced in semiconductor technology (thickness of the measuring resistor and the carrier membrane approx. 1 $\mu$m), which means extreme mechanical sensitivity. Consequently the designs of conventional thermal conduction manometers with a layer shaped measuring resistor are limited to miniaturized sensors. This in turn leads to reduced sensitivity when measuring pressure.

DE-OS 43 08 434 describes an electronic circuit for temperature compensation in a regulated thermal conduction manometer.

The object of the invention is to provide an improved pressure gauge device based on the principle of thermal conduction that exhibits an extended range of use, is designed to be especially compact and unsusceptible to interference, and can be operated with high accuracy.

This purpose is resolved by a pressure gauge device with the features of patent claim 1. Advantageous implementations of the invention result from the dependent claims.

SUMMARY OF THE INVENTION

The invention is based on the idea of using a layer structure, in contrast to conventional structures, in a pressure gauge device based on the principle of thermal conduction, and in which at least one measuring resistor and a thermal conducting layer are arranged in layer form on a carrier foil.

The thermal conducting layer is connected to a thermal contact layer acting as a heat bath (high thermal capacity) and therefore serves for predetermined thermal coupling of the measuring resistor with the remainder of the pressure gauge device. Unlike conventional thermal conduction manometers, the invention thus creates in the thermal conducting layer a means of providing defined heat discharge from the measuring resistor. The thermal conducting layer can also be part of the carrier foil if the latter exhibits sufficient thermal conduction comparable to that of gold.

The invented design allows, for the first time, acceleration of the setting of thermal equilibrium of the measuring resistor, speeding up of the response time and thus the possibility of detecting extremely fast pressure changes (of the order of kHz).

A further advantage of attaching a thermal conducting layer is the possibility of feedback operation of the pressure gauge device. Feedback operation, details of which are explained below with reference to FIG. 2, means that the measuring resistor is altered in a defined way by direct or indirect heating, e.g. is set to a constant temperature. Seeing as the necessary heating power depends on the heat discharge and thus the pressure of the medium, the momentary pressure value can be determined direct from the heating power. The temperature equilibrium of the measuring resistor, subject to the effect of a heat source (possibly an extra heating resistor) and the thermal conducting layer acting as a heat sink, can be set at high speed in the required temperature range.

The thermal conducting layer, possibly by attaching an absorber layer and/or surface structuring, and the measuring resistors or carrier foil are dimensioned so that the heat current from the measuring resistor to the medium passes through the layers for the most part vertically. Addition of a thermal conducting layer allows defined setting of a temperature gradient between the measuring resistor and the medium to be measured. In a preferred implementation of the invention, the measuring resistor is provided on one side of the carrier foil and the thermal conducting layer on the opposite side in a region corresponding to the measuring resistor. Other layer sequences are also possible however, allowing essentially vertical heat current from the measuring resistor through the thermal conducting layer to the medium so that the sensitivity or response time of the pressure gauge device is predetermined. On the opposite side to the carrier foil the measuring resistor can be in direct contact with the medium or bear an absorber layer (single- or double-layer).

The pressure gauge device according to the invention is preferably operated as a Pirani manometer with a bridge circuit. In a first embodiment the measuring resistor and a reference resistor of the same design are spaced apart on the carrier foil, the latter being arranged in a block of good thermal conduction that has a recess accomodate the medium to be measured in the region in which the measuring resistor is arranged on the carrier foil, and form-fits around the region of the carrier foil where the reference resistor is arranged. Thus the reference resistor is entirely connected to a heat bath (infinitely high thermal capacity) so that it is not subjected to any pressure-dependent changes of temperature.

In a second embodiment of the invention the design that has been explained is modified so that the reference resistor like the measuring resistor is arranged on a self-supporting region of the carrier foil. In this case the reference resistor is not enclosed by a heat bath but brought into thermal contact with the medium to be measured. The pressure gauge device contains a sensor part with a layer structure of carrier foil, measuring resistor and thermal conducting layer, as described above, and a reference part likewise with a layer structure of reference resistor, carrier foil and thermal conducting layer. The sensor and reference parts will preferably have the same geometry, the thickness of their thermal conducting layers being different however. In what follows therefore, a distinction is made between a sensor thermal conducting layer and a reference thermal conducting layer in connection with the second embodiment. The reference thermal conducting layer is preferably thicker (by a factor of about 4 to 5 for example) than the sensor thermal conducting layer. In a preferred implementation the measuring resistor can have a separate heating resistor (sensor heating resistor) as can the reference resistor (reference heating resistor).

The pressure gauge device according to the invention allows manometer design with enhanced mechanical stability. This is a result of the measures for improving thermal coupling of the measurement or reference resistor with the environment. Consequently a new design with stable carrier films can be produced that are sufficiently rugged in ventilating operations and allow a larger sensor area compared to conventional resistance manometers with a layer structure. This in turn increases the sensitivity of the pressure gauge device.

The layer structure of the invention also allows miniaturization of the pressure-sensitive sensor part of the pressure gauge device. In a further embodiment of the invention a large number of pressure gauge devices are therefore configured like a matrix in a thermal conduction manometer for position-sensitive resolution in measurement of pressure.

In an advantageous use of the invented device, pressure profiles are detected in a medium with a large number of pressure sensors arranged linear or flat, in the region of interest, of a recipient for example, and intended for simultaneous detection of the pressure values of all pressure sensors.

BRIEF DESCRIPTION OF THE DRAWINGS

Details of the invention are given in what follows with reference to the attached figures, showing FIG. 1 a schematic sectional view of the first embodiment of the pressure gauge device according to the invention, FIG. 2 a block diagram for explanation of the bridge circuit with which pressure gauge devices according to the invention are operated, FIG. 3 a curve of bridge output voltage vs pressure, FIG. 4 a schematic view of the front of a carrier foil of a thermal conduction manometer according to the invention with a large number of pressure sensors, FIG. 5 a schematic view of the rear of a carrier foil of a thermal conduction manometer according to FIG. 3, FIG. 6 an enlarged view of a measuring resistor with a meander structure, FIG. 7 a schematic sectional views (A–D) to illustrate different structures of the thermal conducting layer, and FIG. 8 a schematic sectional view of the second embodiment of the pressure gauge device according to the invention

DETAILED DESCRIPTION OF THE INVENTION

First Embodiment

Figure 1:
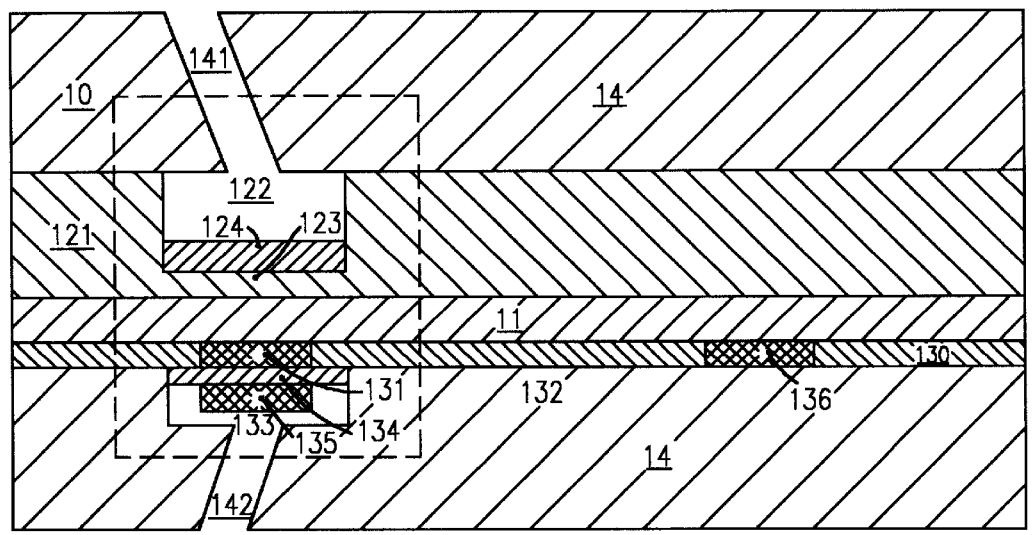

FIG. 1 is a schematic cross-section through the first embodiment of the pressure gauge device according to the invention. For reasons of clarity this view is not shown to scale. In what follows the upper side of the pressure gauge device or of the individual layered components shown in FIG. 1 is referred to as the front and the under side as the rear. This is an arbitrary designation that does not mean any restriction as regards arrangement of certain parts of the pressure gauge device according to the invention on the front or rear. The skilled person will appreciate that the front in operating status can be a randomly oriented side of a manometer referred to the interior of the recipient.

The pressure gauge device according to the invention contains a sensor part 10 (dashed outline). The sensor part 10 comprises a self-supporting carrier foil 11, on whose front a thermal contact layer 121 is attached and on whose rear a resistor and lead layer 130 with a measuring resistor 131 are attached. In a region for the most centrally opposite the position of the measuring resistor 131, the thermal contact layer 121 has a recess 122 through whose extension the thermal contact layer 121 tapers to a thinner thermal conducting layer 123 of predetermined thickness. In the recess 122 on the front of the thermal conducting layer 123 there is also an absorber layer 124 that contacts the medium to be measured. Attachment of the absorber layer is not absolutely essential. A pressure gauge device according to the invention can also be designed so that only the thermal conducting layer on the bottom of the recess is provided in conjunction with the thermal contact layer 121 adjoining on the side without an absorber layer. The possibilities for designing the thermal conducting layer are described below with reference to FIG. 7A–7D. On the rear of the carrier foil 11 there are leads 132 arranged in layers in addition to the layered measuring resistor 131.

The layer structure consisting of the carrier foil 11 and the attached thermal contact and thermal conducting layers 121, 123 and measuring resistor and lead layer 130, 131 is enclosed by a package 14 (roughly hatched). On the front of the package 14 there is a gas inlet or ventilation duct 141 through which the medium to be measured can enter the recess 122. On the rear of the package 14, primarily in the region of extension of the measuring resistor 131, there is a recess 133. whose dimensions (especially parallel to the planes of the layers) correspond to those of the recess 122. The medium to be measured is able to enter through a further ventilation duct 142, also in the region of the rear of the sensor part 10. This is an advantage in reducing the mechanical stress on the sensor part. The ventilation ducts 141, 142 are arranged inclined to a reference line perpendicular to the plane of the carrier foil 11. This produces shielding of the sensor part against electromagnetic radiation (especially thermal radiation). In a special design of the pressure gauge device the recess on the rear of the carrier foil can also be omitted (see below).

The design of the pressure gauge device on the rear of the carrier foil with the measuring resistor and the recess for pressure compensation can be chosen in one of the following forms. In a first example the carrier foil region with the measuring resistor is exposed for direct contact with the gas to be measured. Improvement of the thermal contact is obtained by adding an absorber layer (not shown) to the measuring resistor. If the absorber layer is electrically isolating, it covers direct the meander-shaped measuring resistors and the free areas of the carrier foil in between. If the absorber layer is electrically conducting, an electrically isolating layer is provided between the measuring resistors and the absorber layer. In a further example (shown in FIG. 1) there is an isolating layer 134 on the measuring resistors and a heating resistor 135, the function of which is explained below.

The package 14 consists of material with good thermal conduction. The package 14 firmly clamps the entire layer structure supported by the carrier foil 11. In the region of the measuring resistor 131 and the thermal conducting layer 123 the layer structure is self-supporting. Heat transport from the electrically heated measuring resistor 131 is in predetermined manner primarily through the thermal conducting layer 123 to the package and to the medium surrounding the configuration whose pressure p is to be measured. The medium is formed of a gas with a pressure below atmospheric pressure. The measuring resistor 131 is heated to the temperature T (p) due to the heat transport through the gas being dependent on pressure. Because of the temperature coefficient of the measuring resistor, its resistance R (p) is likewise dependent on pressure.

According to FIG. 1, each reference resistor 136 is arranged on the same plane as the measuring resistor 131 and the connecting leads 132, but without thermal contact with the gas to be measured. Instead the reference resistor 136, through compression of the whole surface, is in tight thermal contact with the package 14 and thus fully shielded against electromagnetic radiation and gas particles. This means that the temperature of the electrically heated reference resistor 136 is identical to the package temperature (heat bath) and independent of pressure.

The heat transport from the measuring resistor 131 through the carrier foil 11 and the thermal conducting layer 123, both of which can also be regarded as one thermal conducting layer, is described under the assumption of defined geometric parameters as follows. The geometric parameters comprise in particular the thickness $d_{11}$ of the carrier foil 11, the thickness $d_{123}$ of the thermal conducting layer 123 and the side lengths a and b of the surface of the thermal conducting layer 123 (or of the base area of the recess 122). After application of a stepped pressure impulse to the medium to be measured, the temperature of the thermal conducting layer as a function of time is:

$$\langle T \rangle (t) \sim \frac{f(p_0)}{F \langle K \rangle} \cdot \sum_m \sum_n \frac{1}{(mn)^2} \cdot \frac{1}{\lambda_{mn}} \cdot \left(1 - e^{-\lambda_{mn} \cdot \frac{\langle K \rangle}{\langle c \rangle} \cdot t}\right)$$

where f ($p_0$) is the calibratable heat removal capacity for a reference pressure $p_0$, <K> the mean coefficient of thermal conductivity of the carrier foil 11 and the thermal conducting layer 123, <c> the mean specific thermal capacity of the carrier foil 11 and the thermal conducting layer 123, and <T> (t) the temperature averaged over the area of the thermal conducting layer. The indices m, n are natural, odd numbers that designate the socalled modes of thermal conduction. The quantity $\lambda_{mn}$ according to $$\lambda_{mn} = \pi^2 [(m/a)^2 + (n/b)^2]$$

is dependent on the side lengths a, b of the thermal conducting layer 123. The time constant $$\tau_{mn} = (1/\lambda_{mn}) \cdot (\langle c \rangle / \langle K \rangle)$$

for certain mode numbers m, n therefore depends on the thermal conduction, the specific thermal capacity and the geometry of the thermal conducting layer (with the carrier foil). Through these quantities it is therefore possible to set the required time constant of the heat current between the measuring resistor 131 and the medium to be measured. Typical time constants $\tau_{11}$ are in the range from 1 ms to several hundred ms and have the following values for example for side lengths a=0.1 cm, b=0.3 cm and a thickness $d_{11}$ of the carrier foil of $10 \cdot 10^{-6}$ m for different thicknesses of the thermal conducting layer $d_{123}$:

$d_{123}=1$ μm: $\tau_{11}=5.4 \cdot 10^{-3}$ s;
$d_{11}=0.1$ μm: $\tau_{11}=38.9 \cdot 10^{-3}$ s; und
$d_{11}=10$ μm: $\tau_{11}=1.2 \cdot 10^{-3}$ s.

In a homogeneous thermal conducting layer the modes decay fast for higher m, n values, so the modes m=1, n=3 (or vice versa) are only about 15% of the fundamental mode for example.

The thermal characteristics become more complicated when a thermal compensation layer or an absorber layer is added. The setting of certain parameters is then made using available numerical simulation methods for thermal conduction on solid bodies. The thickness of a thermal compensation layer is usually selected greater than the thickness of the thermal conducting layer 123 (typical factor 50 to 100).

Detection of the temperature-dependent resistance R (p) is preferably made as in the case of a Pirani manometer with a bridge circuit (see FIG. 2) consisting of two measuring resistors 21 (corresponding to 131) and two reference resistors 22 (corresponding to 136). The reference resistors 22 are of the same design (same material, same geometry) as the measuring resistors 21, but they are to be configured in the first embodiment so that their temperature sets independently of pressure. The reference resistors can also be set up so that they have a larger resistance than the measuring resistors. This larger resistance is a result of the following considerations.

When the bridge supply voltage $V_{ac}$ is applied, the resistance (R) of the measuring resistor increases by $$\Delta R_{Meas} = (\alpha/2) \cdot (\tau/C) \cdot V_{rms}^2$$

(where $V_{rms}$ is the effective value of $V_{ac}$, α is the temperature coefficient, τ is the time constant of the measuring foil, and c is the thermal capacity of the measuring foil). Since the reference resistors are held at package temperature by the package, their temperature and thus their resistance does not alter ($\Delta R_{Ref}=0$). The bridge is so mistuned by $\Delta R_{Meas}$ that it can barely be adjusted or not at all. $\Delta R_{Ref}$ is therefore selected greater by $\Delta R_{Meas}$ for the concrete conditions so that the bridge becomes balanced when $V_{rms}$ is applied. τ can be calculated numerically.

Figure 2:
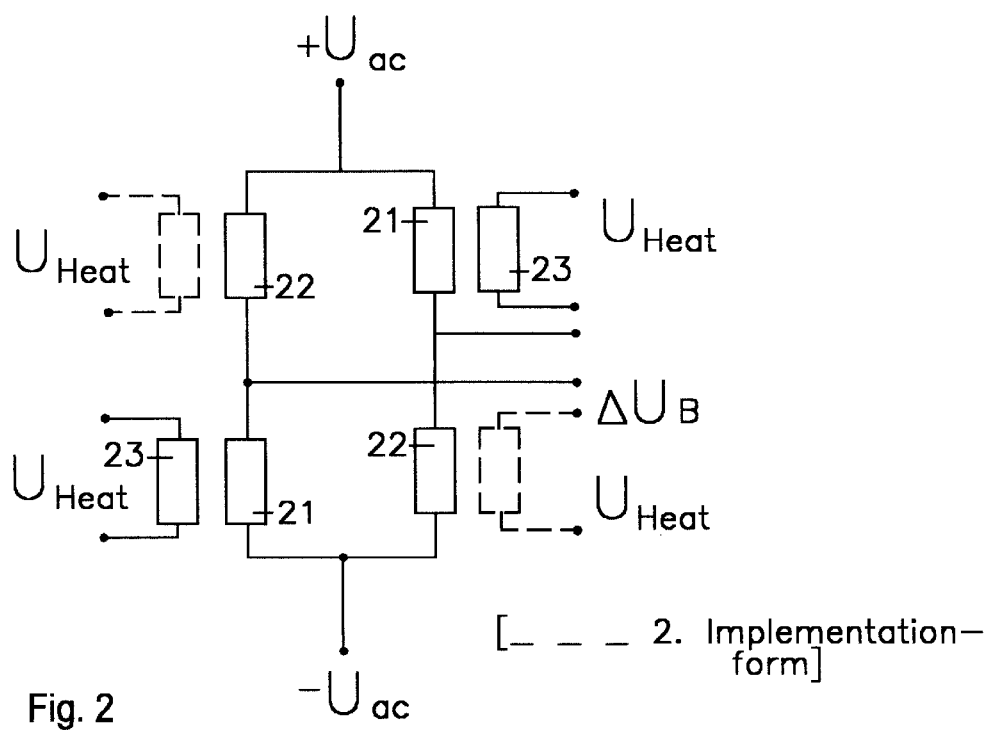

The bridge circuit according to FIG. 2 is operated with an AC voltage $V_{ac}$ and lock-in (f up to 100 kHz). In the embodiment shown, two pairs of measuring and reference resistors 21, 22 are operated back to back. But it is also possible to replace one pair of the measuring and reference resistors by fixed reference resistances for bridge alignment. The amplitude modulation $\Delta V_B$ of the sinusoidal bridge output voltage $V_B$ exhibits high dependence on pressure ($d\Delta V_B/dp$ maximum) for minimum dependence on temperature ($d\Delta V_B/dT$). In a first measuring procedure the resistors of the bridge circuit are fed constant heating power (periodic, e.g. sinusoidal heating current) with the operating voltage $V_{ac}$, and the pressure is detected from the measured bridge output voltage $\Delta V_B$ after appropriate calibration.

Alternatively it is possible, besides the direct heating, to heat each measuring resistor 21 or reference resistor 22 indirectly (see 2nd embodiment) by an extra heating resistor 23 (FIG. 1: measuring resistor 131, heating resistor 135) in order to compensate, partly or entirely, the heat current from the measuring resistors to the medium. In this measuring procedure a variable current is applied to the heating resistors 23 so that the bridge output voltage $\Delta V_B$ is constant. The heating power of the heating resistors 23 is then in turn a direct measure of heat transport from the measuring resistors to the gas to be measured and thus of the gas pressure.

In addition to feedback operation of the manometer, the heating resistor also serves for balancing the bridge and/or compensation of interfering signals, drift or heating up through radioactive radiation ("nuclear" heating). Feedback operation makes it possible to increase the spectral bandwidth of the system (function of frequency). The loss of sensitivity is compensated by lock-in. Feedback is implemented by selecting the heating power of the heating resistor 23 on the measuring resistor 21 or reference resistor 22 (see 2nd embodiment) proportional to the bridge output voltage $\Delta V_B$. The proportionality factor itself can be chosen independent of or dependent on frequency. A frequency-dependent proportionality factor in feedback control produces the advantage of avoiding a drop in sensitivity for frequencies above the critical frequency.

Calibration of the measuring bridge will possibly be special to gas, since each type of gas exhibits a specific particle mobility and thus a specific thermal conduction. Detection of the amplitude-modulated bridge output voltage $\Delta V_B$ is preferably done by lock-in. But there is the alternative of operating the bridge circuit with DC voltage.

Figure 3:
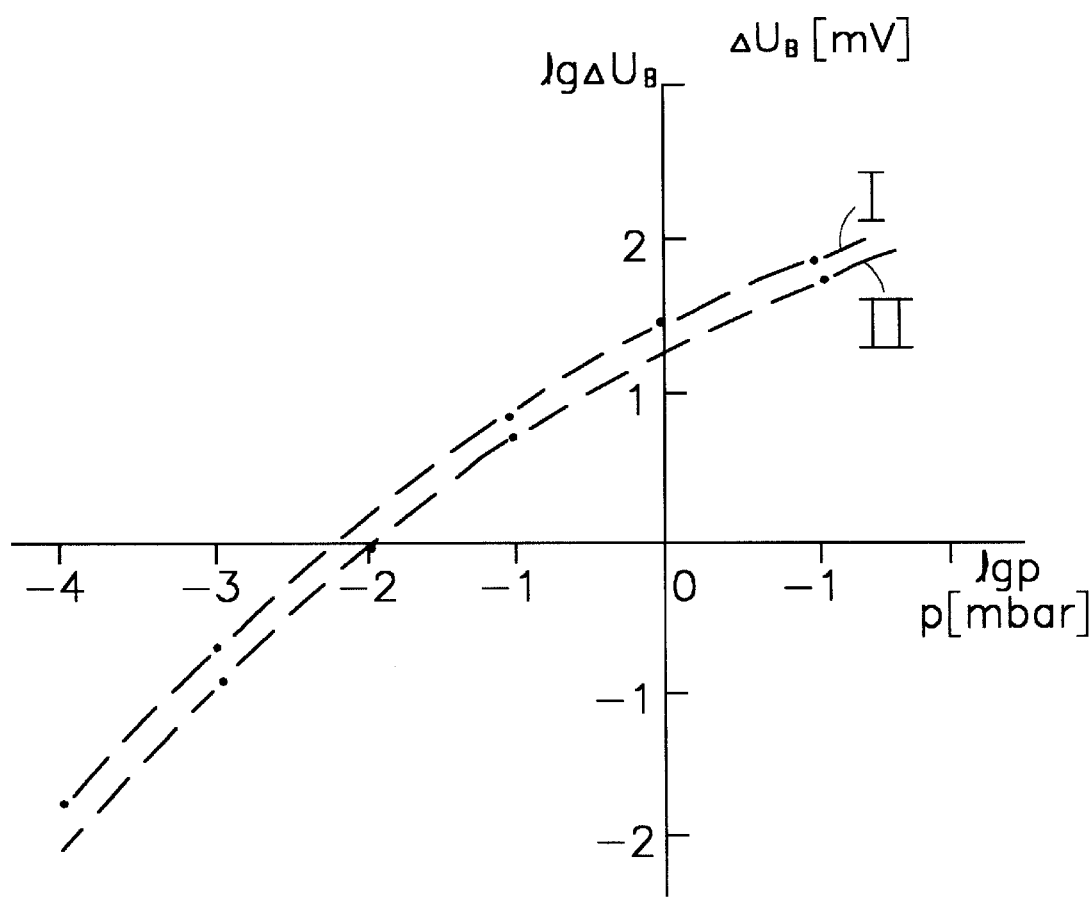

FIG. 3 shows an example of the dependence of the bridge output voltage $\Delta V_B$ on the gas pressure to be measured for two different manometers (I, II). The measurements were made using air as the working gas.

The design of a pressure gauge device according to FIG. 1 is possible, for example, with the following materials and dimensions. The carrier foil 11 consists of an isolating material, preferably mica (muscovite). Alternatively the use of a diamond foil is possible, which exhibits extremely high thermal conductivity. The carrier foil 11 can also consist of electrically conductive material, preferably Si wafer material, high-grade steel or nickel, in which case the foil side bearing the resistors and connecting leads is to be provided with an isolating interim layer. The thickness of the carrier foil 11 is about 15 $\mu$m. Generally the carrier foil 11 is formed of a stable, plane material that is not expandable even at high temperatures. In particular, the material of the carrier foil should have such a plane surface that the depths of the recesses 122 and 123 (minimum 15 $\mu$m and 1 $\mu$m respectively) can be created with reproducibility. Such requirements are met especially well by mica foil.

The thermal conducting layer 123 will preferably be of gold. The thickness of the thermal conducting layer 123 determines the sensitivity of the pressure measurement, because the thermal conducting layer 123 represents a defined heat sink and thus the temperature of the absorber layer 124 is primarily determined by the thickness of the thermal conducting layer 123. Since the heat current into the gas is proportional to the temperature gradient towards the sensor (especially the absorber), measurement is preferably at a high temperature of the absorber layer 124. The temperature can be produced by increasing the electrical power fed to the measuring resistor 131, by reducing the thickness of the thermal conducting layer 123, or by expanding the area of the thermal conducting layer 123. The thickness of the thermal conducting layer 123 is 0.2 $\mu$m for example. The thermal contact layer 121 will preferably consist of gold of constant thickness and covers the entire front of the carrier foil except in the region of the thermal conducting layer 123.

The absorber layer 124 is not absolutely essential but is preferred for achieving high sensitivity in pressure measurement. The absorber layer 124 is intended for creating good thermal contact with the adjoining gas. For this purpose the absorber layer 124 will preferably have a microscopically rough surface. Instead of the separate absorber layer 124, appropriate surface treatment can be made on the thermal conducting layer 123.

The thickness of the measuring and reference resistor layers 131, 136 on the rear of the carrier foil 11 is approx. 0.02 $\mu$m. The thickness of the layer with the connecting leads 132 is approx. 1 $\mu$m. Because of this difference in thickness, and differing from the schematic in FIG. 1, a step is created in the region of the measuring and reference resistors 131, 136 at the transition to the connecting leads layer 132. In this way it is possible to dispense with the separate recess 133 in the package 14 and to route the duct 142 entirely through the rear of the package 14 to the measuring resistor. An example of carrier foil layering is described below with reference to FIGS. 4 through 6.

Although the heated measuring resistor is of large format in the pressure gauge device according to the invention, this does not limit the upward extent of the range of pressure that can be measured. The layer structure and the extremely flat surface of the carrier foil 11 allow creation of an extremely small spacing between the absorber 124 and the facing wall of the package (approx. 10 $\mu$m) on the one hand, and between the rear of the measuring resistor (possibly with isolating layer and heating resistor) and the facing wall of the package in the recess 133 (up to 1 $\mu$m) on the other. The relation of this spacing to the mean free path length of the particles in the gas determines the upper pressure limit.

The form of pressure gauge devices according to the invention in the region of the thermal conducting layer and possibly the absorber layer determines the response time of pressure measurement. If no absorber layer is provided and the thermal conducting layer bears structuring (e.g. roughness) to promote heat transfer, the response time of pressure measurement is smaller than in a design in which the thermal conducting layer has an unstructured, homogeneous surface and is provided with an absorber layer. Structuring of the surface of the thermal conducting layer can be made so that the time of heat discharge (e.g. upon application of a pressure impulse) to the thermal contact layer can be described by exactly one exponential function with one time constant.

Figure 4:
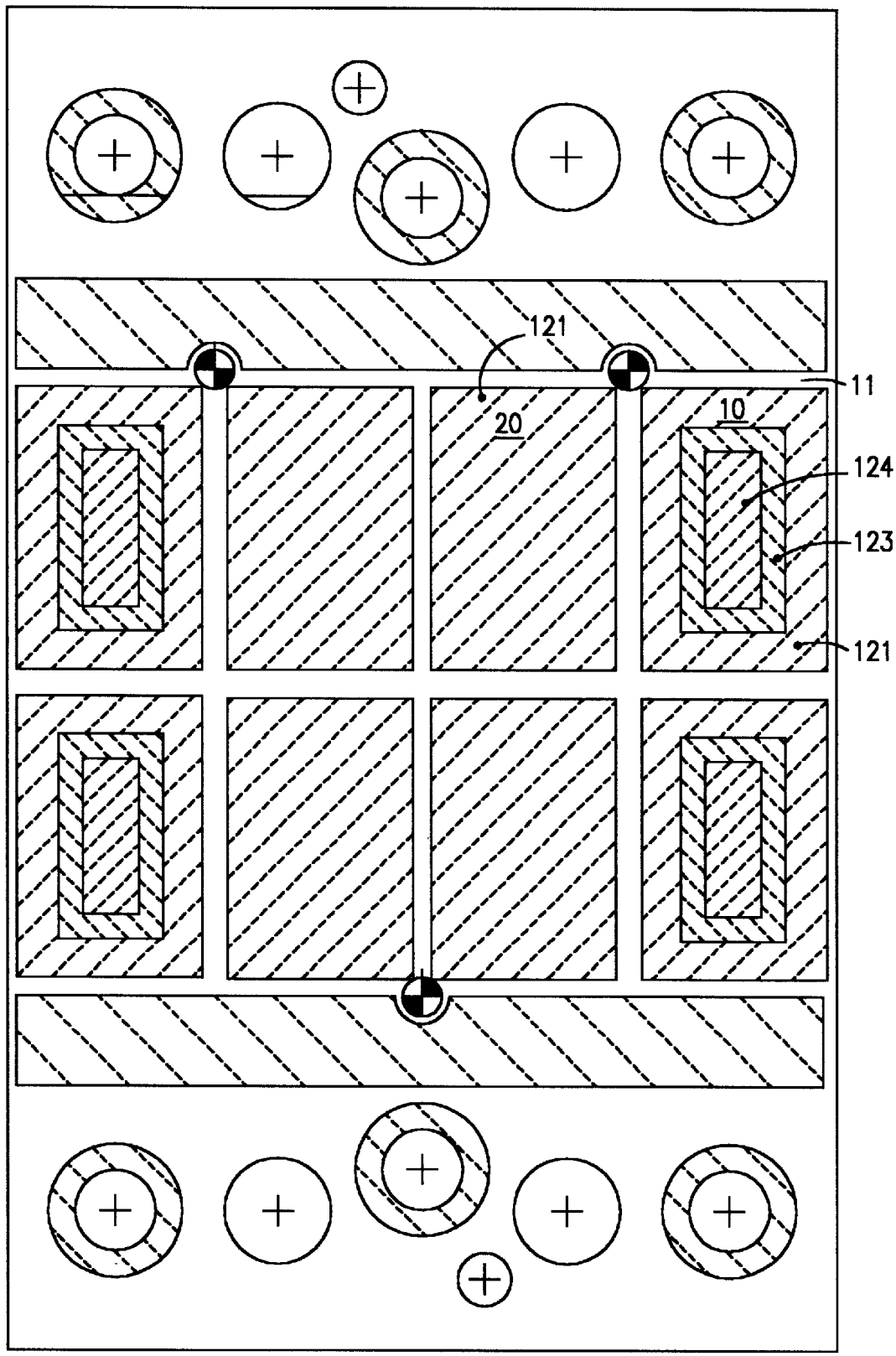

In a preferred implementation, a thermal conduction manometer according to the invention is provided with a large number of pressure gauge devices as in FIG. 1. The layer structure allows a matrix or array arrangement that can be miniaturized depending on measurement requirements. It is only a matter of ensuring that the spacing between the measuring and reference resistors is large enough so that the reference resistors are not influenced as a function of pressure. FIG. 4 shows an enlarged plan view of a carrier foil 11 coated as in the invention. The outer dimensions of the foil with the aligning and connecting regions on the edge are 2*3 cm². The carrier foil 11 bears sensor units 10 with thermal contact layers 121, thermal conducting layers 123 and absorber layers 124. The absorber layer may also cover the entire thermal conducting layer. Each of the sensor units shown is assigned a reference unit 20. In the region of the reference units 20, unlike with the sensor units 10, there is only a thermal contact layer 121.

Figure 5:
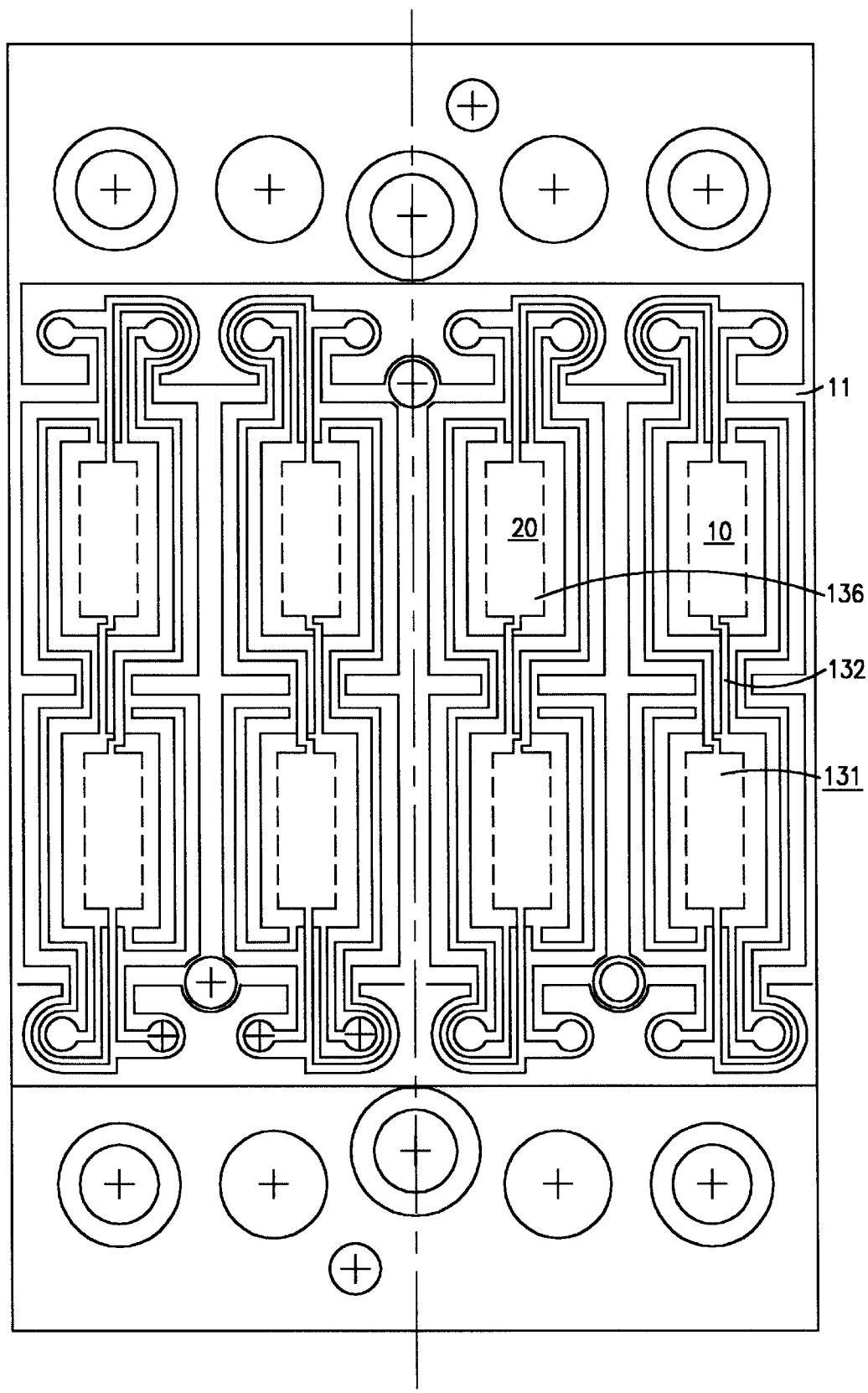

On the rear of the carrier foil 11 there are, as in FIG. 5, the measuring resistor layer 131 and reference resistor layer 136 with the connecting leads 132 arranged in between and opposite sensor and reference units 10, 20.

Each measuring and reference resistor layer 131, 136 in FIG. 5 will best comprise two measuring and two reference resistors arranged on the foil in a meander form and interleaved. In this way each pair of sensor and reference units 10, 20 (with the lead connections) forms a complete measuring bridge according to FIG. 2, with two measuring resistors in the sensor unit 10 and two reference resistors in the reference unit 20. An example of the meandering form of the measuring and reference resistors is shown enlarged in FIG. 6.

Figure 6:
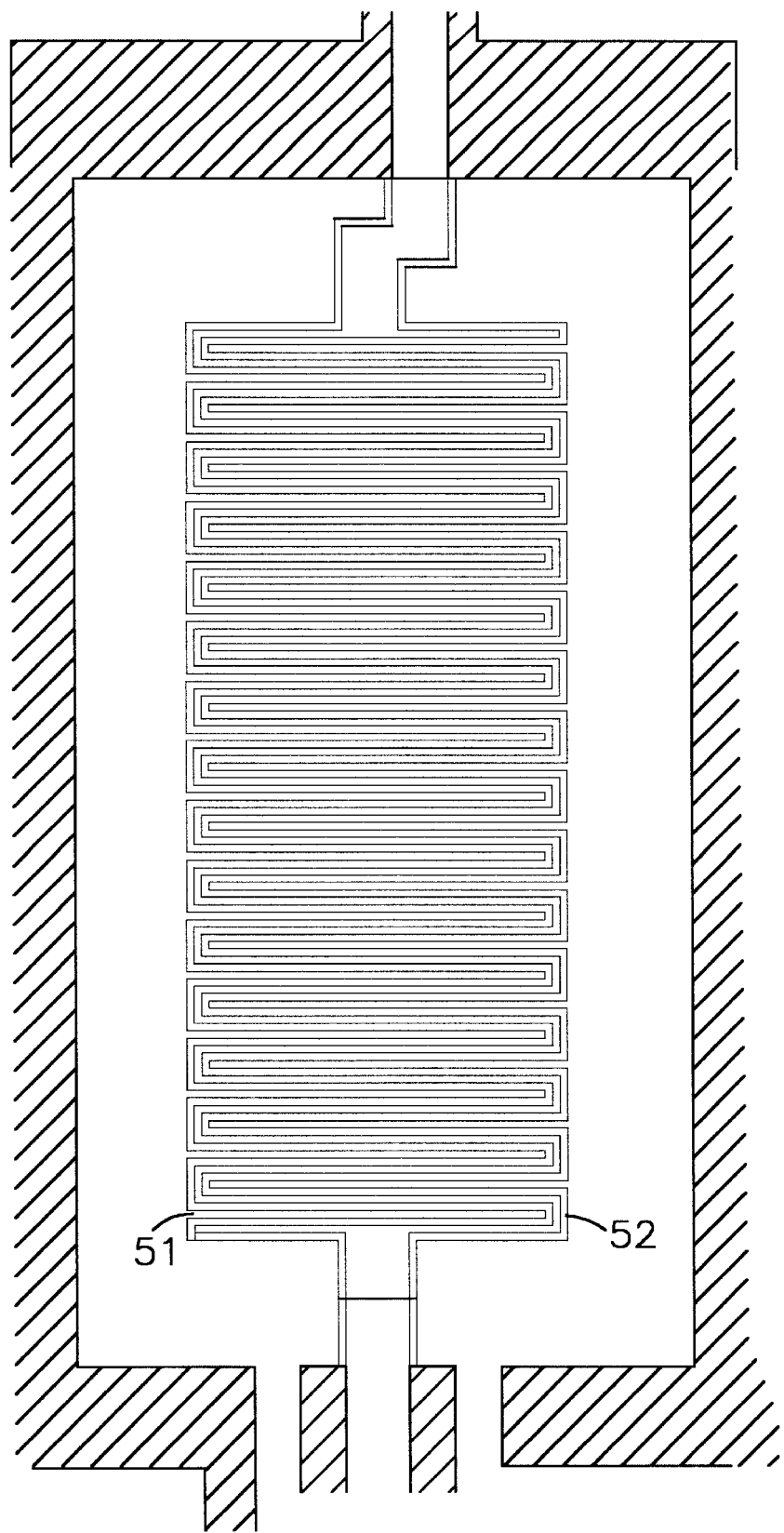

In FIG. 6 two measuring or reference resistors 51, 52 are created in layer form on the rear of the carrier foil. Each resistor comprises a large number of resistor elements, in a meander. configuration, whose width is substantially less than the width of the connecting leads between the resistors. The interleaved meanders 51, 52 present the advantage that the pressure gauge device according to the invention can also be operated without interference in strong magnetic fields, since two adjacent leads have opposite current sense. So forces in the magnetic field cancel one another out. This is a special advantage compared to conventional Pirani manometers, which are generally unsuitable for use in strong magnetic fields. The meander interleaving also causes the two measuring resistors to measure the temperature in the same region of the foil. The same applies to the reference resistors. Furthermore, the meander form minimizes the area of the lead loops.

A thermal conduction manometer with a matrix-type sensor configuration can be designed as a flexible manometer foil. This is spanned by a method according to the invention to detect pressure profiles in a recipient in the region of interest.

FIGS. 7A–7D show different forms of the thermal conducting layer of a pressure gauge device according to the invention. In a homogeneous thermal conducting layer according to FIG. 7A without extra layering, several modes with different temperature distribution are excited on the thermal conducting layer 123 by a pressure impulse. Each mode has its own time constant and amplitude. The fundamental mode has the highest values for time constant and amplitude. These values decrease markedly at higher mode numbers. The turn-on and turn-off responses of the pressure gauge device for a pressure impulse are then described by superposition of a large number of time constants. This is also the case in an arrangement of a homogeneous thermal conducting layer and a homogeneous absorber layer over the entire thermal conducting layer as in FIG. 7B.

To simplify the timing of the turn-on and turn-off responses of the pressure gauge device, it is possible to introduce structuring of the thermal conducting layer so that the impulse response is described to good approximation by one time constant. For structuring of the thermal conducting layer, a thermal compensation layer 125 according to FIG. 7C can be provided for example. The thermal compensation layer 125 is thicker than the thermal conducting layer 123 (factor of 50 to 100). Preferred parameters assuming side lengths a=0.1 cm and =0.3 cm of the thermal conducting layer 123 (see above) are side lengths c=0.4 cm and d=0.2 cm of the thermal compensation layer 125 with a thickness ratio of approx. 100.

The thermal compensation layer 125, like the thermal conducting layer, is preferably of gold. The configuration of the thermal compensation layer 125 is opposite the measuring resistor in the center of the thermal conducting layer 123. The thermal compensation layer 125 causes lower modes to be suppressed and only higher modes (see above) to be excited, the change of time constant for a change of mode number only being slight. The value $d\tau/dN$ ($\tau$=time constant of the mode with the number N) is small. Thus the impulse response can be described by a single time constant, in particular up to a rise or fall time of the pressure impulse of $\geq 1$ ms. Determination of concrete crosswise and lengthwise side lengths and the thickness ratios is made by methods of numerical simulation by optimizing thermal conductivity in relation to one single exponential function. The thermal compensation layer 125 and the measuring resistor layer 131 should be as identical in size as possible (area dimensions).

In a further alternative, an absorber layer 124 is provided on the thermal compensation layer 125, as shown in FIG. 7D.

FIGS. 7A–7D also show that the recess 122 in the thermal contact layer 121 (or area dimensions of the thermal conducting layer 123) can be grater than the area dimensions of the measuring resistor 136.

Second Embodiment

FIG. 8 shows a schematic sectional view through the second embodiment of the pressure gauge device according to the invention. What has been said above about the first embodiment applies accordingly to the sensor part 10, the detection of the resistance of the measuring resistor, the array configuration of a large number of sensor elements and the procedures for using the pressure gauge device. Unlike in the first embodiment however, in the second embodiment there are two self-supporting carrier foil regions (measuring and reference carrier foil) for each measuring and reference resistor pair, so that both the measuring and the reference resistor can be in thermal contact with the medium or gas to be measured. Here only the reference part 20 is described, which is designed analogous to the sensor part 10. As is shown below, in the second embodiment both the measuring and the reference resistor form measuring resistors (with different temperature responses), but for reasons of clarity they will continue to be referred to as measuring or reference resistor.

On the sensor part 20 (see FIG. 8) there is the layer structure consisting of the carrier foil 11, the reference resistor 136, the thermal conducting layer 223 with the adjoining thermal contact layer 121 enclosed in the package 14. The absorber layer 224, an isolating layer 234 and a heating resistor 235 can be added as extra layers (as, optionally, for sensor part 10). On the front the package possesses a gas inlet or ventilation duct 241 through which the medium to be measured can enter the recess 222, formed by the tapering of the thermal conducting layer 223 (or thermal conducting and absorber layers) from the thermal contact layer 121. On the rear the package 14 has a further recess 233 with another ventilation duct 242 analogous to the recess 122 of the sensor part.

The thickness of the thermal conducting layer 223 of the reference part 20 is greater than that of the thermal conducting layer 123 of the sensor part 10 by a predetermined factor (>1). The factor will preferably be in the range from 3 to 10, e.g. between 4 and 5. In the latter case, if the measuring thermal conducting layer 123 is about 0.1 to 0.5 μm thick, the thickness of the reference thermal conducting layer will be approx. 0.4 to 2.5 μm.

The design with an exposed reference part possesses the special advantage that temperature drift can be compensated. The resistance coefficients of the measuring and reference resistors (possibly nonlinear) can alter, especially in operation of the pressure gauge device at relatively high temperatures (e.g. 200 to 500° C.) or as a result of nuclear radiation at the point of use. The relationship $$[R_M(T_M)/R_R(T_R)]=f(\alpha)[R_M(T_0)/R_R(T_0)]$$

applies for an infinitesimal temperature drift $\Delta V_B$ ($d\Delta V_B/dT=0$) for the resistance values $R_M$ (measuring resistor) and $R_R$ (reference resistor) in a bridge circuit, where $T_M$ is the temperature of the measuring resistor, $T_R$ the temperature of the reference resistor and $T_0$ the reference temperature. So, by exposing the reference part, the temperature of the reference resistor can be altered and temperature drift can thus be compensated. Making the thermal conducting layer 223 of the reference part 20 different in thickness to the thermal conducting layer 123 of the sensor part 10 allows consideration of the dependence on pressure of the reference resistor temperature.

In a preferred design the temperature of the resistors 131, 136 is set by separate heating resistors 135 and 235. This allows temperature regulation independently of the supply voltage of the bridge circuit. So it is possible to operate the heating circuit (heating resistors 23 in FIG. 2) at low frequency (e.g. 1 kHz) and the bridge measuring circuit at high frequency (approx. 10 to 100 kHz, preferably at 50 kHz). The separate heating of the measuring and reference resistors presents the extra advantage that the thermal isolation between the sensor part 10 and the reference part 20 is improved. In a pressure gauge device according to the invention, thermal cross-coupling between the sensor and reference parts is eliminated within the achieved accuracy of pressure measurement.

The layer structures in the sensor and reference parts 10, 20 best have the same crosswise dimensions, ie the same area and volume in a direction parallel to the planes of the layers. The carrier foil 11, which, in the region of the recesses of the sensor or reference part 10, 20, can also be considered as a measuring or reference foil, preferably consists, as in the first embodiment, of mica or of a metal foil (e.g. steel, nickel, titanium) coated with an isolating material. The carrier foil 11 is coated with the thermal contact layer 121, which consists of a gold layer for example (thickness up to 20 μm). This extra coating makes the carrier foil self-supporting, which is of special advantage for attaching an array of a large number of pressure sensors. A holder 14 of good thermal conduction, preferably of metal, serves as a receptacle or package and makes the pressure gauge device suitably rugged.

The measuring or reference resistors are created simultaneously, preferably in the meander form, in production of the pressure gauge device. In this way the resistors have identical characteristics. Four identical, temperature-dependent meander resistors together with the connecting leads 132 (see FIGS. 1, 8) form a complete Wheatstone measuring bridge. Two resistors are deposited on the measuring foil and two on the reference foil by sputtering, vapor deposition or electroplating in one operation. This produces high bridge symmetry in terms of all physical parameters like resistance, temperature coefficient, coefficient of thermal conductivity, capacitances and inductances. The thermal conducting layers on the surfaces of the measuring and reference foil opposite the resistance layers are of constant thickness over the layer area and consist of material with good thermal conduction, preferably gold. The thickness of the thermal conducting layer 223 is substantially greater than that of the thermal conducting layer 123. Depending on design there will be centrally, on one or both thermal conducting layers, a further, much thicker layer of good thermal conduction that acts as an absorber layer. To achieve a certain thermal conduction response of the overall structure, the absorber layer will preferably be rectangular with certain lengthwise and crosswise dimensions, and with the described relation to the lengthwise and crosswise dimensions of the thermal conducting layer below (and thus to the dimensions of the exposed sensor area). All geometric parameters of the thermal conducting and absorber layers follow the laws of thermal conduction.

The thermal conducting layers merge into the thermal contact layer 121 at the edge of the exposed sensor areas. The recess (122 or 222) created by the difference in thickness between the thermal contact layer and the thermal conducting layer (possibly with an absorber layer) is closed by the holder 14 excepting the duct 141 or 241. The free height of the recess, ie the space between the rear of the foil holder and the surface of the thermal conducting or absorber layer, is preferably 10 μm or less.

The heating resistors 135 or 235 are fed by current or voltage sources independent of the measuring circuit. According to the explanation above, the heating resistors allow suppression of temperature drift over the entire pressure range from $10^{-5}$ to $10^3$ mbar with pressure-dependent regulation of the heating currents. Interfering signals, produced for example by nuclear heating in use in a fusion reactor, can be compensated entirely. The heating feedback of the sensor foils is preferably implemented with time-dependent negative feedback. The negative feedback is greater for slowly changing pressure signals than for fast changing pressure signals. This compensates the integrating action of the sensor foil, which is characteristic of conventional foil manometers. Furthermore, fast pressure changes (in the region of 1 ms) can be measured with high sensitivity.

Further Advantages

Pressure gauge devices according to the invention possess the following advantages. They are especially compact and stable, meaning excellent suitability for experiments in plasma physics. There is little sensitivity to gas surges. The gauge devices can be operated in lock-in mode with a variable carrier frequency. Operation with alternating current presents the extra advantage that material changes as a function of current are avoided by the periodic change of current sense. The entire design is capable of working in a high vacuum. Special flanging with recipients is unnecessary. The layer structure allows especially good thermal contact with the gas to be measured so that measurement is possible in large ranges of pressure with enhanced accuracy. Pressure can be measured in a range from atmospheric pressure through to high vacuum (c. $10^{-5}$ Torr). Compared to ionization vacuum gauges for example, the current consumption is considerably less. Pressure gauge devices according to the invention can be used in all areas of vacuum engineering and combined with radiation measuring instruments (bolometers).

Further advantages of the invention are its use in high magnetic fields (without any restriction up to 10 T). The pressure gauge devices can heat up to 500° C., with measurement at up to 300° C. Exceptionally high time resolution of down to 1 ms is achieved throughout the large range of measurement.

The addition of a separate thermal conducting layer to the carrier foil presents the advantage that the time constants of the heat discharge can be set precisely through the geometric parameters of the thermal conducting layer (e.g. thickness of an Au layer). Formation of the carrier foil as a thermal conducting layer is possible at sufficiently high thermal conduction. Incorporation of a diamond foil as the carrier foil allows thermal conduction to the package. But the disadvantage of this is that the thickness of such a diamond foil is difficult to set and there can be charging effects after high-energy radiation.

What is claimed is:

1. A thermal conduction manometer comprising:
   a carrier foil;
   at least one electrically heatable measuring resistor arranged as a layer on a surface of the carrier foil;
   an isolating layer arranged on said measuring resistor;
   a thermal contact layer arranged on an opposed surface of said carrier foil, the thermal contact layer containing a recess having an opening through which a medium to be measured can flow into the recess;
   an absorber layer arranged in the recess and in contact with the thermal contact layer;
   a heating resistor arranged on the isolating layer for heating said measuring resistor, the heating resistor being adapted to at least partially compensate for heat passing from the measuring resistor to the medium to be measured, and
   at least one reference resistor spaced from and electrically connected to the measuring resistor to form part of a Wheatstone bridge,
   wherein heat generated by the measuring resistor passes substantially perpendicularly from the measuring resistor to the medium through the carrier foil, the thermal contact layer and the absorber layer, and
   pressure is determined as a function of heat passing to the medium.

2. The manometer according to claim 1 in which the thermal contact layer has a portion forming a thermal conducting layer located between the recess and the carrier foil whose thickness is less than that of the thermal contact layer.

3. The manometer according to claim 1 in which the absorber layer contacts the medium to be measured in the recess.

4. The manometer according to claim 1 in which the thermal conducting layer has a surface structured such that the timing of heat discharge from the thermal conducting layer to the thermal contact layer is represented by exactly one exponential function with one time constant.

5. The manometer according to claim 1 in which, besides the measuring resistor, there are on the carrier foil in layer form connecting leads, whereby the carrier foil with the thermal contact layer on one side and the resistors and leads on the other is enclosed by a form-fitting package that has at least one first gas-inlet duct to the recess and on the measuring resistor forms a second recess with a second gas-inlet duct.

6. The manometer according to claim 5 in which the thickness of the measuring and reference resistors is less than that of the connecting leads, thereby forming the second measuring recess and a second reference recess.

7. The manometer according to claim 5 in which the measuring resistors and reference resistors are formed of striplines arranged in a meandering layered form.

8. The manometer according to claim 1 in which, besides the measuring resistor, there are on the carrier foil in layer form connecting leads, whereby the thermal contact layer forms a reference thermal conducting layer in a region opposite the reference resistor whose thickness is less than that of the thermal contact layer such that a first reference recess is formed for the thermal contact layer.

9. The manometer according to claim 8 in which the thickness of the reference thermal conducting layer is greater than that of the thermal conducting layer.

10. The manometer according to claim 1 in which the Wheatstone bridge is formed such that a bridge output voltage $V_B$ is a measure of the pressure in the medium to be measured.

11. The manometer according to claim 1 in which the measuring resistor and the reference resistor is in thermal contact with a heating resistor whose heating power can be set such that a bridge output voltage $V_B$ is substantially constant, whereby the heating power of the heating resistor is a measure of the pressure in the medium to be measured.

12. The manometer according to claim 1 in which the Wheatstone bridge is adapted to be operated with a.c. voltage.

13. The manometer according to claim 1 in which the carrier foil is mica.

14. The manometer according to claim 1 in which a multiplicity of pairs of measuring and reference resistors are arranged in matrix fashion.

15. The manometer according to claim 14 in which the matrix arrangement forms a foil, flexible manometer adapted for a local pressure measurement.

16. The manometer according to claim 1 in which, on the thermal conducting layer and the reference thermal conducting layer, there is a thermal compensation layer whose dimensions are selected such that the heat discharge from the measuring or reference thermal compensation layer to the thermal contact layer is substantially singly exponential.

17. The manometer according to claim 16 in which the thickness of the thermal compensation layer is greater than that of the thermal conducting layer or the reference thermal conducting layer.

18. The pressure gauge according to claim 1 in which the measuring resistor or the reference resistor is in thermal contact with a heating resistor whose heating power can be set such that a bridge output voltage $V_B$ is substantially constant, whereby the heating power of the heating resistor is a measure of the pressure in the medium to be measured.

19. The manometer according to claim 1 in which, on the thermal conducting layer or the reference thermal conducting layer, there is a thermal compensation layer whose dimensions are selected such that the heat discharge from the measuring or reference thermal compensation layer to the thermal contact layer is substantially singly exponential.

20. The manometer according to claim 19 in which the thickness of the thermal compensation layer is greater than that of the thermal conducting layer or the reference thermal conducting layer.

* * * * *

UNITED STATES PATENT AND TRADEMARK OFFICE
CERTIFICATE OF CORRECTION

PATENT NO. : 6,382,031 B1  Page 1 of 1
DATED : May 7, 2002
INVENTOR(S) : Mast et al.

It is certified that error appears in the above-identified patent and that said Letters Patent is hereby corrected as shown below:

Column 10,
Line 32, please change "grater" to -- greater --.

Signed and Sealed this

Sixth Day of August, 2002

*Attest:*

*Attesting Officer*

JAMES E. ROGAN
*Director of the United States Patent and Trademark Office*